Nov. 21, 1939.  C. BEST  2,180,893
WEIGH BEAM DAMPING DEVICE
Filed Feb. 17, 1938   3 Sheets-Sheet 1

Inventor
Cyril Best
By Watson, Cole, Morse & Grindle
Attorneys.

Nov. 21, 1939.  C. BEST  2,180,893

WEIGH BEAM DAMPING DEVICE

Filed Feb. 17, 1938  3 Sheets-Sheet 2

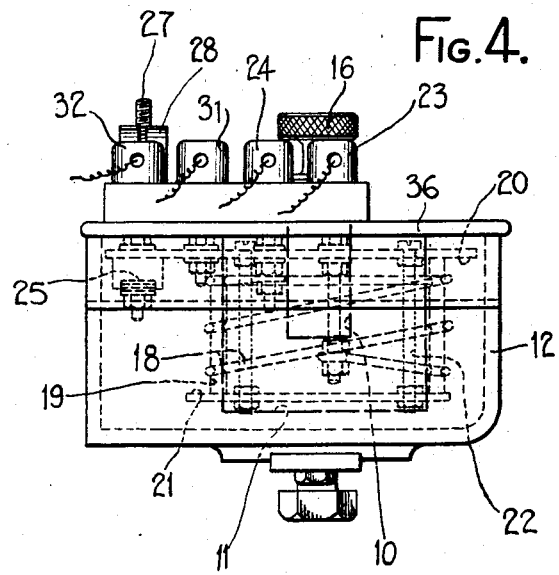
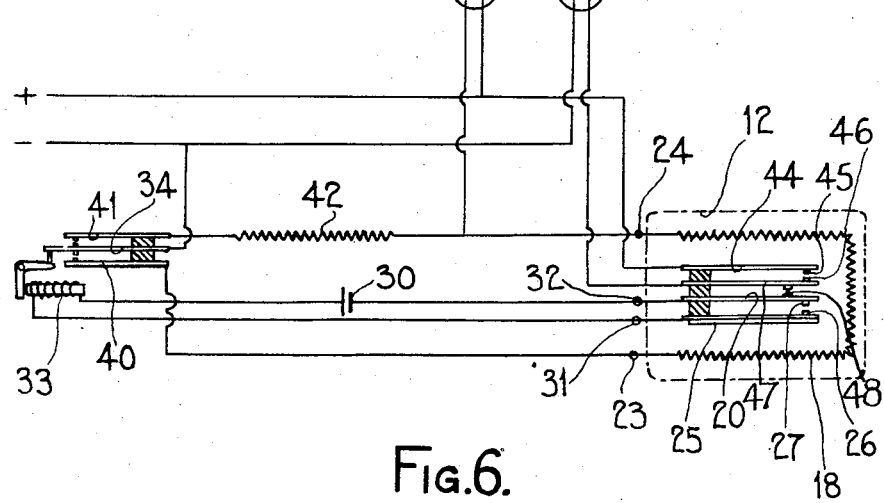

Patented Nov. 21, 1939

2,180,893

UNITED STATES PATENT OFFICE 2,180,893

WEIGH BEAM DAMPING DEVICE

Cyril Best, Deptford, London, England, assignor to Molins Machine Company Limited, Deptford, London, England Application February 17, 1938, Serial No. 191,068 In Great Britain April 15, 1937

6 Claims. (Cl. 188—93)

This invention is for improvements in or relating to weighing apparatuses and in particular is for an improvement in or modification of the invention described in United States patent specification No. 2,006,255.

It is found when using the apparatus described in prior United States patent specification No. 2,006,255 that the time taken to bring the weigh beam to rest varies during the course of a day due to the change in viscosity of the oil in which the beam controlling vane moves as the temperature of the oil varies.

It is an object of the invention when mechanism according to United States patent specification No. 2,006,255 is used employing a liquid (such as oil) in which the viscosity of the liquid varies to a sufficient extent with variations in atmospheric temperature, to keep constant the time period in which the weigh beam can be brought to rest.

When weighing mechanisms are used on cigarette making machines it is desirable to have a mechanism which will be capable of making a relatively large number of weighings in a given time. The machines work at high speeds producing at least a 1000 up to 1200 cigarettes per minute. In accordance with prior proposals individual cigarettes are sometimes selected from the product of a continuous rod type cigarette making machine at predetermined intervals and weighed, and according to their weights the relative speed between that of the tobacco feeding mechanism and that of the cigarette rod is regulated, for example, by means of automatic mechanism. It is important in such a case to weigh as high a percentage of the product of the machine as possible, and this is only possible by making the weighing as frequent as possible.

It is an object of the invention to maintain a steady efficiency in apparatus of the kind described in United States patent specification No. 2,006,255 irrespective of atmospheric temperature changes which may take place in the region in which the apparatus is to operate, and in accordance with the present invention this object is achieved by increasing the temperature of the liquid in which the vane moves to a predetermined temperature greater than the atmospheric temperature to be expected in the region in which the apparatus is to operate, and by providing means to maintain the liquid substantially at the predetermined temperature thereby maintaining the viscosity of the liquid substantially constant and enabling the weigh beam (when the parts are suitably adjusted) to be brought to rest in the least time possible.

The means for maintaining the liquid at a constant temperature may comprise a thermostatically controlled heating device.

An embodiment of the invention will be described by way of example with reference to the accompanying drawings, in which:

Figure 4 is an end view of Figure 3.

Figure 6 is a diagram showing an alternative circuit in which is incorporated means for visually ascertaining if the circuit is functioning correctly.

Like reference numerals refer to like parts throughout the specification and drawings.

Figure 1:
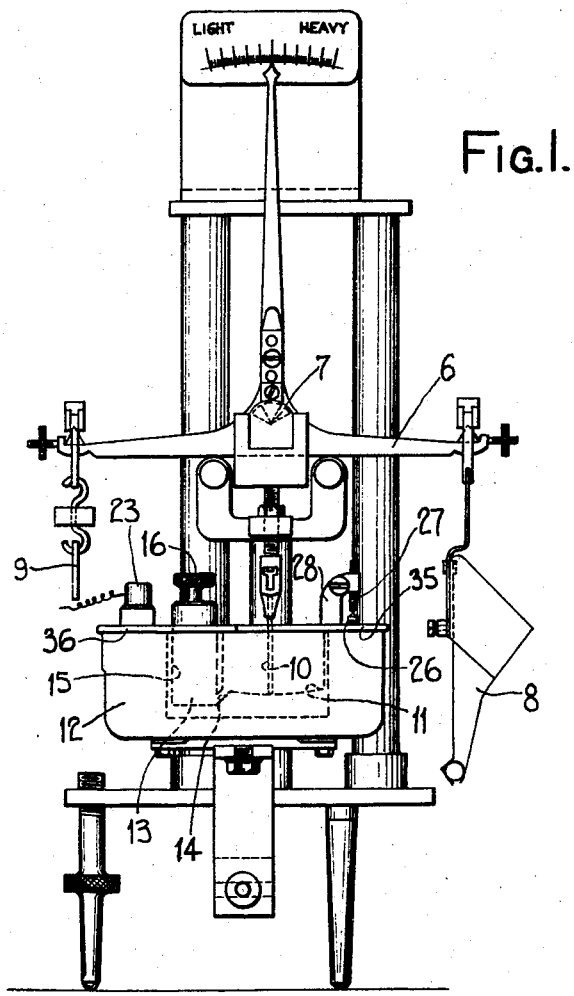
Figure 1 is a front elevation of a weighing device having the invention applied thereto.

The weighing device comprises a weigh beam 6 balanced by knife edges 7 in well known manner, one end of the weigh beam supporting a scale pan 8, the other end of the beam supporting a weight 9. To the weigh beam there is connected a flexible vane 10 arranged to move in a container 11 and to dampen and control the movement of the weigh beam in the manner described in United States patent specification No. 2,006,255.

The container 11 is located in a larger container 12, which larger container also contains a liquid, preferably oil. The container 11 in which the vane 10 moves comprises two compartments, the one in which the vane 10 is arranged to move, and an auxiliary compartment 13 which is connected by an aperture 14 with the compartment in which the vane 10 moves.

Associated with the auxiliary container 13 is a screw propelled plunger 15, the operation of which is effected by means of the knob 16. By moving the plunger 15 in an upward or a downward direction the oil is permitted to pass from the container in which the vane 10 is movable, through the aperture 14 and to the auxiliary container or vice versa, as the case may be. By this arrangement the quantity of oil in the compartment in which the vane 10 is moved may be controlled, and an indicator 17 is provided to indicate the level at which the oil should be maintained in order to obtain the greatest efficiency from the apparatus for a given setting thereof.

The oil in the larger container 12 is heated to a temperature above the atmospheric temperatures to be expected in the area in which the apparatus is to operate. The heating device for heating the oil in the container 12 comprises an electrical resistance 18 which is, as can be seen from the drawings, disposed within the oil and passed around insulated supports 19 secured between supporting elements 20 and 21 respectively. The elements 20 and 21 are spaced apart from each other by spacing elements 22 comprising screws and locking nuts. The two ends of the electrical resistance are connected with terminals 23 and 24 respectively.

The terminals 23 and 24 are connected with a source of electrical energy and the supply of energy to the terminals is controlled by a bi-metal thermostat 25. The thermostat 25 is submerged in the oil contained in the container 12 and supports a contact 26 which is arranged to engage with a further contact 27 fixed to the support 20. The contact 27 comprises a screw and is arranged in a split support 28. When the contact 27 has been adjusted it is locked in position by means of a screw 29.

Figure 5:
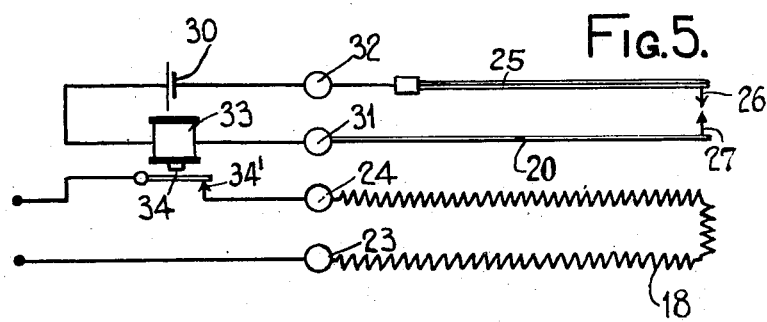
Figure 5 is a diagram showing an electrical circuit for heating the liquid in said container and maintaining the viscosity of the liquid.

The source of energy which energizes the heating elements would, if the thermostat were included in the heating circuit, cause sparking between the contacts 26 and 27. To avoid such sparking, therefore, the thermostat 25 is provided in a secondary circuit receiving energy from a battery 30, see Figure 5. The battery has a low voltage of, for example, 1.5 volts and sparking does not therefore occur to any appreciable extent between the contacts 26 and 27.

The battery 30 is connected with two terminals 31 and 32, the terminal 31 being connected with the support 20 and through the support 20 with the contact 27. The terminal 32 is connected with the thermostat 25. Each of the terminals 23, 24, 31 and 32 is mounted on the support 20, but the terminals 23, 24 and 32 are insulated from the support 20.

In the secondary circuit energized by the battery 30 there is a relay 33, 34 which, when due to the expansion of the thermostat 25 contact between the elements 26 and 27 is made, causes the armature 34 of the relay to move away from a contact 34' in the heating circuit, thus causing the supply of energy to the terminals 23 and 24 to be interrupted. A screw 38 (Figure 2) is provided for flexing the thermostat strip to provide means, in conjunction with the adjustable contact 27, for adjusting the temperature range of the thermostat. If desired, the supply of energy to the terminals 23 and 24 may be passed through a suitable transformer.

The oil in the containers 11 and 12 is protected by covers 35 and 36 and the terminals 23, 24, 31 and 32 are each provided with caps which contain the connecting wires and which are pressed into neck portions formed on the cover 36 and into which the terminals protrude. The caps are each provided with a shoulder 37 which engages with the edge of a neck portion. The terminals are constructed and shrouded in this way to protect them from oil which creeps up from the container 11. Any such oil is readily noticed when it approaches the terminals and can be wiped away.

It will be appreciated that if the apparatus has been adjusted so that with the oil at a certain temperature and viscosity the weigh beam returns to zero position in a given time which is the least possible for that particular adjustment and quantity of oil, then if the temperature decreases, the viscosity of the oil increases and thereby increases the time taken for the weigh beam to return to zero. On the other hand, if the temperature of the oil increases, the viscosity of the oil is reduced, and in that case the weigh beam will swing past the zero position and will have to return to the zero position again so that in that case also the time to bring the weigh beam to rest is increased.

In practice in accordance with the invention the shape of the oil container 11, the quantity of oil in relation to the size of the vane 10 and the extent to which the vane extends into the oil are pre-arrranged when the oil is at a predetermined temperature greater than the greatest atmospheric temperature expected in the region in which the apparatus is to operate, and the various parts of the apparatus are adjusted so that the weigh beam 6 when released will, under these conditions, swing back to a zero position in the least possible time. When these adjustments have been made the oil, due to the thermostatic control, is maintained at a substantially constant predetermined temperature and thereby ensures that the viscosity of the oil will remain constant so that with the parts so suitably adjusted the time taken for the beam 6 to return to its zero position will be constant.

Figure 6 shows a diagram of an alternative circuit in which is incorporated means to give notice if the circuit ceases to function correctly.

When the apparatus is put into operation the switch which closes the circuit causes a lamp 39 to be lighted. This light remains on whilst the circuit remains completed, but should the circuit for some reason be broken, the light will go out and the operator will immediately know that the apparatus is not functioning correctly.

The lamp 39 is connected in series with the heater element 18 which is connected to a contact member 40. When the thermostat contacts 26 and 27 are apart, due to the temperature of the oil in the container 12 being low, the switch 34 makes contact with the contact member 40, thus closing the circuit and causing the energy from the supply to pass through the lamp 39 and the heater element 18.

After the temperature of the oil in the container 12 has risen sufficiently, due to the heat derived from the element 18, the bi-metal thermostat 25 brings the contacts 26 and 27 together, thereby closing a secondary circuit and causing the battery 30 to energize the relay 33. The energizing of the relay 33 causes the switch 34 to break contact with the member 40 (thereby switching off the element 18) and to make contact with a further member 41. The energy from the supply will now pass from the lamp 39 to a resistance 42, of preferably the same electrical resistance as the element 18, and thence through the member 41 and the switch 34 to the negative side of the supply.

By this arrangement the lamp 39 remains lighted when the supply to the element 18 is either switched on or off by the relay 33, but should the element 18 fail or its circuit become broken the lamp 39 would cease to be lighted, thus giving warning of the failure.

A further lamp 43, preferably red in color, is also included. The lamp 43 is only lighted if the battery 30 in the secondary circuit fails to operate the relay 33 due to either the battery 30 becoming exhausted or by some other defect causing a break in the secondary circuit.

The lamp 43 is in a separate circuit which, for simplicity is connected to the same source of supply as the lamp 39.

Figure 2:
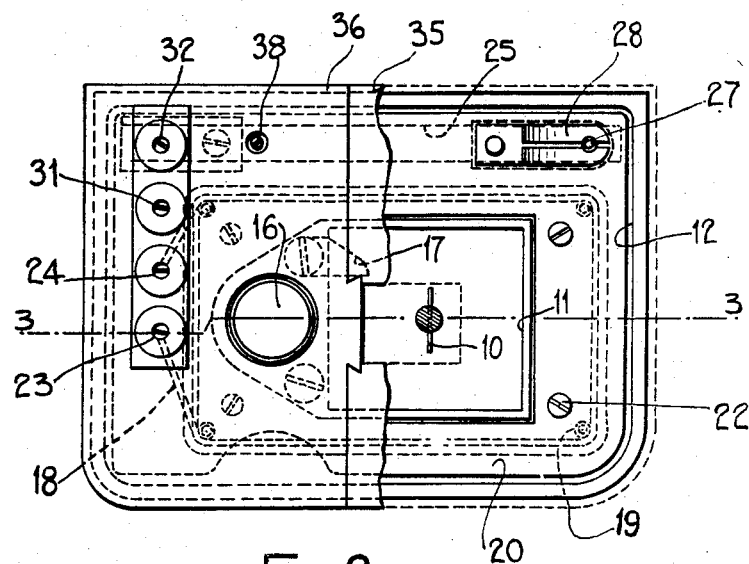
Figure 2 is a plan, drawn to an enlarged scale, of a liquid container in which a weigh beam controlling vane is arranged to move.
Figure 3:
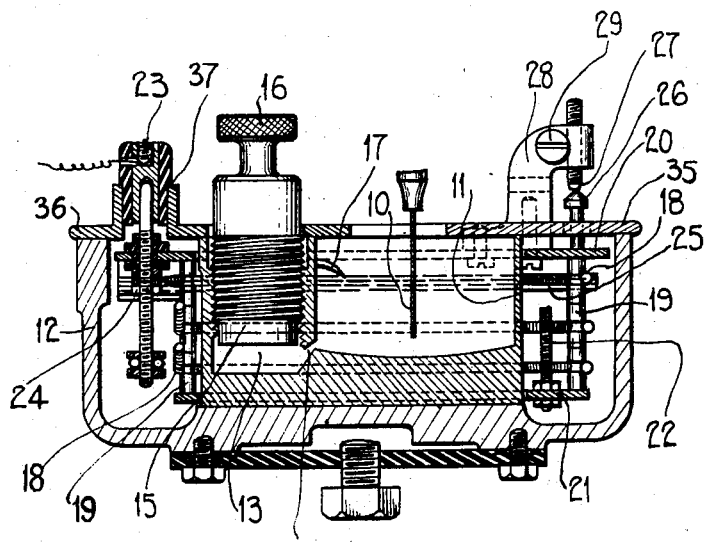
Figure 3 is a sectional elevation on line 3—3, Figure 2.

Should the battery 30 or any component in the secondary circuit cease to function, the switch 34 and the member 40 will remain in contact and the temperature of the oil in the container 12 will be increased, thus causing the bi-metal thermostat 25 to bend beyond the predetermined amount. In this alternative construction the contact 27 instead of being fixed as shown in Figures 1, 2 and 3, is arranged so that although the support 20 is normally rigid, it is capable of flexing under pressure exerted by the contact 26. Should the temperature of the oil in the container 12 rise above the predetermined level the bi-metal thermostat 25 will bend and will cause the support 20 to flex towards a further element 44 on which is mounted a contact 45 which will then engage with a contact 46 carried by a yielding support 47 insulated from and connected with the support 20 by an insulator 48. When the contacts 45 and 46 are moved into engagement with each other the lamp 43 becomes lighted and thus gives a visual warning to the operator that the battery 30 or its circuit has ceased to function. If desired, the lamp 43 can be replaced by a bell or other device to give audible warning.

What I claim as my invention and desire to secure by Letters Patent is:

1. In weighing apparatus of the type described, a dashpot comprising a larger and a smaller container each containing a liquid, said smaller container being disposed within the larger container, an electrical resistance submerged in the liquid in the larger container and connected with a source of energy whereby the liquid in the smaller container is heated to a predetermined temperature greater than the greatest atmospheric temperature to be expected in the region in which the apparatus is to operate and a thermostat submerged in the liquid of the larger container to maintain the liquid in the smaller container substantially at the predetermined temperature and thereby to maintain the viscosity of the liquid substantially constant.

2. In weighing apparatus of the type described, a dashpot comprising a larger and a smaller container each containing a liquid, said smaller container being disposed within the larger container, an electrical resistance submerged in the liquid in the larger container and connected with a source of energy whereby the liquid in the smaller container is heated to a predetermined temperature greater than the greatest atmospheric temperature to be expected in the region in which the apparatus is to operate and a bi-metallic strip connected with said resistance and submerged in the liquid in the larger container, said strip serving to make or break the connection between the resistance and the source of energy therefor to maintain the liquid in the smaller container substantially at the predetermined temperature and thereby to maintain the viscosity of the liquid substantially constant.

3. In weighing apparatus of the type described, a dashpot comprising a larger and a smaller container each containing a liquid, said smaller container being disposed within the larger container, an auxiliary compartment for liquid disposed within the larger container and communicating with the smaller container, means associated with the auxiliary compartment to control the passage of liquid from said compartment to the smaller container and thereby to regulate the quantity of liquid in the smaller container, an electrical resistance submerged in the liquid in the larger container and connected with a source of energy whereby the liquid in the smaller container is heated to a predetermined temperature greater than the greatest atmospheric temperature to be expected in the region in which the apparatus is to operate and a thermostat directly responsive to the temperature of the liquid in the larger container to maintain the liquid in the smaller container substantially at the predetermined temperature and thereby to maintain the viscosity of the liquid substantially constant.

4. In weighing apparatus of the type described, a dashpot comprising a larger and a smaller container each containing a liquid, said smaller container being disposed within the larger container, an auxiliary compartment for liquid disposed within the larger container, a communicating passage between the auxiliary compartment and the smaller container, a screw propelled plunger associated with the auxiliary compartment to control the passage of liquid from said compartment to the smaller container and thereby to regulate the quantity of liquid in the smaller container, an electrical resistance submerged in the liquid in the larger container and connected with a source of energy whereby the liquid in the smaller container is heated to a predetermined temperature greater than the greatest atmospheric temperature to be expected in the region in which the apparatus is to operate and a thermostat directly responsive to the temperature of the liquid in the larger container to maintain the liquid in the smaller container substantially at the predetermined temperature and thereby to maintain the viscosity of the liquid substantially constant.

5. In weighing apparatus of the type described, a dashpot comprising a larger and a smaller container each containing a liquid, said smaller container being disposed within the larger container, an auxiliary compartment for liquid disposed within the larger container, a communicating passage between the auxiliary compartment and the smaller container, a screw propelled plunger associated with the auxiliary compartment to control the passage of liquid from said compartment to the smaller container and thereby to regulate the quantity of liquid in the smaller container, an electrical resistance submerged in the liquid in the larger container and connected with a source of energy whereby the liquid in the smaller container is heated to a predetermined temperature greater than the greatest atmospheric temperature to be expected in the region in which the apparatus is to operate and a bi-metallic strip connected with said resistance and submerged in the liquid in the larger container, said strip serving to make or break the connection between the resistance and the source of energy therefor to maintain the liquid in the smaller container substantially at the predetermined temperature and thereby to maintain the viscosity of the liquid substantially constant.

6. In weighing apparatus of the type described, a dashpot comprising a larger and a smaller container each containing a liquid, said smaller container being disposed within the larger container, a vane adapted to be yieldingly connected with said weigh-beam and movable in the liquid in the smaller container so as to lag behind the weigh-beam in reaching a state of equilibrium during a weighing operation, an electrical resistance submerged in the liquid in the larger container and connected with a source of energy whereby the liquid in the smaller container is heated to a predetermined temperature greater than the greatest atmospheric temperature to be expected in the region in which the apparatus is to operate, a thermostat to maintain the liquid in the smaller container substantially at the predetermined temperature and thereby to maintain the viscosity of the liquid substantially constant, and a warning device operative upon the failure of said thermostat to function correctly.

CYRIL BEST.